Jan. 30, 1945.  A. BOENECKE  2,368,100
SNAP FASTENER
Filed Feb. 16, 1940  2 Sheets-Sheet 1
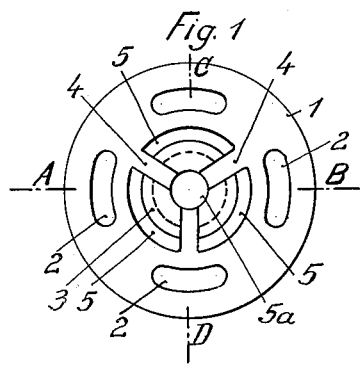
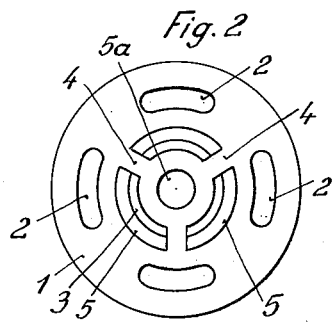
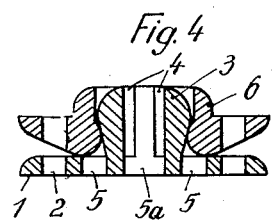
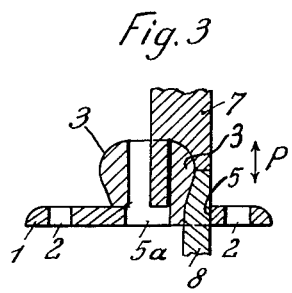
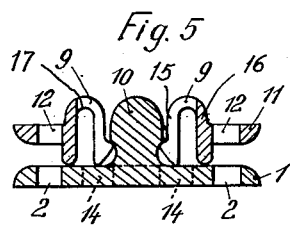
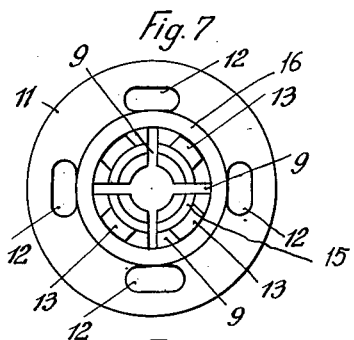
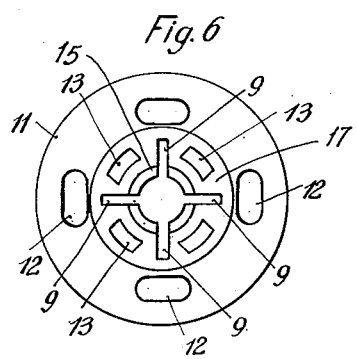
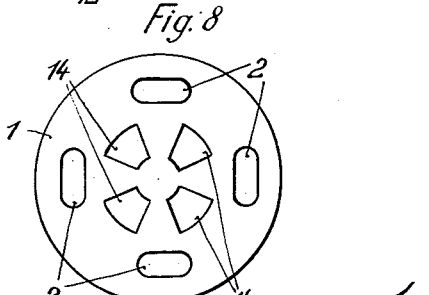
Inventor,
A. Boenecke
By: Glascock Downing & Seebold
Attys.

Jan. 30, 1945.   A. BOENECKE   2,368,100
SNAP FASTENER
Filed Feb. 16, 1940   2 Sheets-Sheet 2
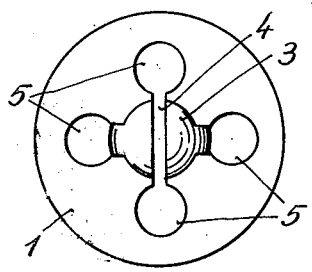
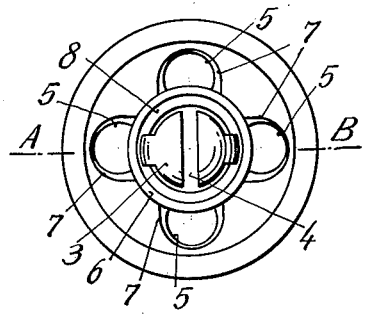
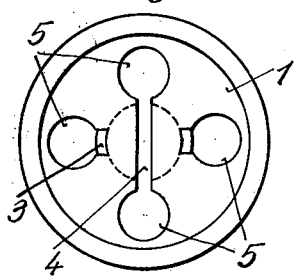
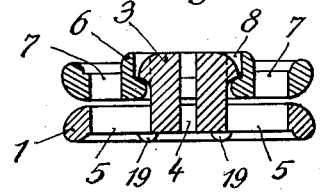
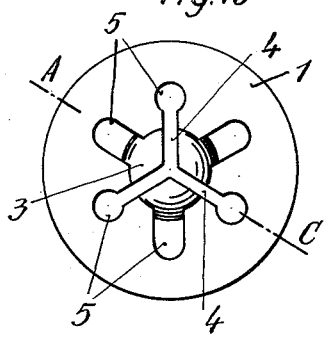
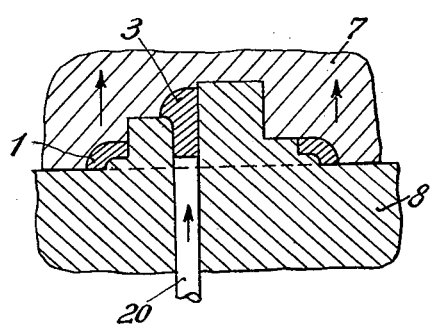
Inventor,
A. Boenecke
By Glascock Downing & Seebold
Attys.

Patented Jan. 30, 1945

2,368,100

UNITED STATES PATENT OFFICE 2,368,100

SNAP FASTENER

Alfred Boenecke, Berlin-Schoneberg, Germany; vested in the Alien Property Custodian Application February 16, 1940, Serial No. 319,344
In Germany March 28, 1939

3 Claims. (Cl. 24—216)

This invention relates to a snap fastener made from a synthetic plastic material, preferably an artificial substance that can be die-cast or pressed.

It is known to make the ball member or the socket member of a snap fastener integral with the base portion which is slotted to increase the yieldability and elasticity of the base member. Conditions are different, however, when synthetic plastic materials serve as starting materials, and it is not possible to maintain the dimensions, particularly the wall thickness of the parts, usually chosen for metal snap fasteners to insure the necessary springiness and strength, since the wall thickness of parts made from artificial material must be relatively large to make allowance for the low breaking strength of this material.

As a large wall thickness of the snap fastener members interferes of course with the smooth and elastic introduction of the stud member into the socket member, it is an object of the invention to overcome this trouble by forming the stud member or the socket member of a snap fastener from projections arranged in a circle and individually disposed on the base portion so as to act as levers fixed at one end. These thick-walled projections are capable of swinging freely and form the yielding part of a stud member or socket member. In order to increase the yieldability of these freely swinging elements the base portion of the stud member possesses at the point where the projections extend into the base portion a corresponding number of slots disposed along the freely swinging elements of the stud member. Both the base portion and the freely swinging elements or projections arranged thereon may be thick-walled, that is, so thick and strong that they cannot be damaged, for instance by tearing or breaking, when the snap fastener is in use. The thick-walled construction of these parts does, however, not reduce the elasticity thereof, since it has been found that they possess an even greater and softer resiliency than metal snap fasteners.

When the stud member of a snap fastener has been constructed in the manner indicated, the corresponding socket member forms a rigid inelastic body.

It is possible also to construct the stud member as rigid body and to make the socket member elastic. In this case, the wall of the socket member has a U-shaped cross section open toward the stud, and the portions of the cross sections disposed toward the central axis are slotted. Between these slots the web portions may be provided with additional openings to increase spring action.

An essential feature of the invention includes the forming of tools and the manner of producing the snap fastener. For producing the stud body and the base portion two parts that are vertically displaceable relative to one another are employed, the displacement occurring on the longitudinal central axis of the stud body which together with the base portion is formed in one operation. The two relatively displaceable parts form the impression die or die mold. One of these parts is fitted with cores for forming slots and a portion of the stud body, i. e. the portion thereof tapering toward the base portion, the cores terminating at the point where the body begins to taper, and the other part of the die or mold also possesses cores which form the slots located in the stud body itself and which are so shaped that simultaneously the head of the stud is formed above the point where tapering commences.

The impression dies or die molds employed according to the invention afford the advantage of constituting rigid structures by means of which large quantities of snap fasteners can be readily produced at the same time.

The invention is illustrated in the accompanying drawings, in which Figures 1 to 4 show one form of the invention; Figs. 5 to 8, a modification thereof; Figs. 9 to 12, another modification thereof; and Figs. 13 and 14, still another modification thereof.

More particularly;

Figure 1 is a top view of the ball and base portion for the first form of the invention.

Fig. 2 is a bottom view of Fig. 1.

Fig. 3 is a section on the line C—D, of Fig. 1, showing a tool for manufacturing the body of the snap fastener.

Fig. 4 is a section on the line A—B, of Fig. 1, with the socket member attached.

Fig. 5 is a sectional view of the second form of the snap fastener with slotted socket member and rigid stud member.

Fig. 6 is a top view of a socket member shown in Fig. 5.

Fig. 7 is an inside view of a socket member shown in Fig. 5.

Fig. 8 is a bottom view of the stud plate shown in Fig. 5.

Fig. 9 is a top view of the stud member of the third form of the invention.

Fig. 10 is a bottom view thereof.

Fig. 11 is a top view of a snap fastener provided with stud member and socket member.

Fig. 12 is a section on the line A—B, of Fig. 11.

Fig. 13 is a top view of the fourth form of the invention. It is thought that further detail views which in principle would be similar to Figs. 10, 11 and 12 may be dispensed with.

Fig. 14 diagrammatically shows how by means of the tools a stud member with its base portion as shown in Fig. 13 can be produced, Fig. 14 referring to the section on the line A—C, of Fig. 13.

In the construction shown in Figs. 1 to 4, the base portion 1 provided with sewing slots 2 is integral with the stud body 3 which, as indicated in Figs. 3 and 4, tapers toward the base portion 1. The top portion of the stud member 3 forms the head, and the stud body 3, as shown in Fig. 1, has three slots 4 and a central bore 5a so that a hollow body is formed. As can be seen in Figs. 3 and 4, the slots 4 extend up to the upper face of the base portion 1.

The base portion 1 possesses slots 5 which extend along the sector-like parts of the stud body 3, as shown in Figs. 1 and 2, and considerably assist in rendering the base portion 1 and the body member 3 flexible.

Fig. 1 further indicates that the slots 4 and 5 adjoin each other. Although the body member 3 and the base 1 are interrupted by these slots, connection between the two members is not weakened and deformation or breakage during use of the fastener is out of the question. The socket member 6 of this type of fastener is of rigid construction, as shown in Fig. 4.

The stud member is produced by two relatively displaceable pressing tools or telescoping die mold members of which parts designated 7, 8 are shown in Fig. 3.

The two die members are moved in the direction of the double arrow P, i. e. of the longitudinal axis of the stud body. As shown in Fig. 3, the mold portion 7 possesses cores for forming the slots 4 and serves also for forming the head of the stud member. The lower die 8 produces the slots 5 in the base portion 1 and also the tapering portion of the stud member. Fig. 3 shows how the two parts 7 and 8 meet at the tapering point.

In the structure shown in Figs. 5 to 7 the socket member of the fastener is yielding and elastic. For this purpose the socket member is integrally formed centrally with two spaced cylindrical portions 15 and 16 concentrically arranged and with their outer ends joined by an arched end portion 17, whereby in cross section (note Fig. 5) a pair of substantially U-shaped members are positioned on opposite sides of the central axis of the socket member to engage the stud member 10. A plurality of radial slots 9 divide the cylindrical portion 15 nearer the axis of the socket into segments, and also pass through the arched end portion 17, as best shown in Figs. 5 to 7. Thus, each of the cylindrical portions 15 becomes a series of spaced projections arranged in a circle and individually disposed on the base portion to resiliently engage the stud member 10, the outer arched portion 17 of each projection serving as a wide resilient fulcrum from which the narrower inner extremity of each segmental projection swings as the stud member 10 is inserted into or removed from the socket member. Between the slots 9, the arched end portion 17 is provided with apertures 13 to increase the resiliency of the segments. The stud body 10 is not slotted but made rigid. The socket base 11 has slots 12 for the sewing threads, and the base portion 1 of the stud member 3 has, as stated, the sewing slots 2. To facilitate its production by means of two rigid die members, as indicated above, the base portion 1 is provided with openings 14. As shown in Fig. 5, the cross-sectional profile of the socket wall is such that an edge engaging the undercut portion of the stud from below is formed to insure interlocking of both members of the snap fastener.

A third form of snap fastener is shown in Figs. 9 to 12, which differs from the form shown in Figs. 1 to 4 in that the slot 4 divides the stud head and the base portion and a two-part head is formed of the two projections 3.

In the construction shown by Fig. 13 the stud and base portion have through-going slots as in the third form, but the slots 4 are in this instance placed so that the stud comprises three parts formed of the three projections 3.

The tool for producing this last-mentioned structure is shown in diagram in Fig. 14 and corresponds in principle to the tool shown in Fig. 3. It comprises two relatively displaceable parts having cores shaped according to the requirements of the structure shown in Fig. 13. With the aid of lifters 20 the finished fasteners can be pressed off after opening of the tool in the direction of the arrow.

As the base 1 of the stud member in the various constructions shown is relatively weak owing to the slots, it may be reinforced by suitable accumulations of material, as for instance by the projections 19, Fig. 12. Reinforcements in spots serve also for preventing breakage of the base in the direction of the slots 4 without reducing elasticity. The sewing slots have depressions in the direction of the edge to protect the sewing thread.

I claim:

1. A snap fastener of synthetic plastic material, comprising a stud member, a socket member and a slotted base portion for each of said members and integral therewith, the socket member including a series of spaced projections arranged in a circle and individually disposed on the base portion to resiliently engage the stud member, the socket member in cross section comprising substantially inverted U-shaped portions on each side of its central axis and the sides of the U-profiles nearer the central axis being provided with circumferentially spaced slots dividing them into segments.

2. A snap fastener according to claim 1 wherein said segments are fulcrumed from the arched outer portions of the U-profiles, said arched outer portions also being slotted and provided with apertures spaced from said slots.

3. A snap fastener of synthetic plastic material, comprising a stud member, a socket member and a slotted base portion for each of said members and integral therewith, the socket member including a pair of spaced concentric cylindrical portions with their outer ends joined by an arched end portion, the cylindrical portion nearer the central axis of the socket member being provided with circumferentially spaced slots dividing such cylindrical portion into segments, said slots also passing through said arched end portion, whereby said segments are fulcrumed upon said arched portion when the stud member is inserted into or removed from the socket member.

ALFRED BOENECKE.